United States Patent [19]

Schlarb et al.

[11] Patent Number: 4,936,502

[45] Date of Patent: Jun. 26, 1990

[54] METHOD FOR CONTROLLING MACHINE PARAMETERS IN FRICTION WELDING

[75] Inventors: Alois K. H. Schlarb; Gottfried W. Ehrenstein, both of Kassel, Fed. Rep. of Germany

[73] Assignee: Branson Ultraschall Niederlassung der Emerson Technologies GmbH & CO

[21] Appl. No.: 346,546

[22] Filed: May 2, 1989

[30] Foreign Application Priority Data

May 3, 1988 [DE] Fed. Rep. of Germany ....... 3815003

[51] Int. Cl.$^5$ .................. B23K 20/12; B29C 65/06
[52] U.S. Cl. .................. 228/102; 228/112; 228/2; 228/9; 156/73.5; 156/580.1
[58] Field of Search .................. 228/2, 9, 102, 112, 228/113; 156/73.5, 73.1, 580.1

[56] References Cited

U.S. PATENT DOCUMENTS 3,678,566  7/1972  Ellis et al. ..................... 228/2 X
3,777,967  12/1973  Searle et al. ..................... 228/2
4,757,932  7/1988  Benn et al. ..................... 228/9

Primary Examiner—Kenneth J. Ramsey
Attorney, Agent, or Firm—Harness, Dickey & Pierce

[57] ABSTRACT

In vibration welding the process takes place in a number of phases. The quality of the welding connection depends on which phase is reached during vibration and which conditions prevail in the phase 3 of the vibration process. According to the invention the welding machine is provided with a measuring and controlling system for the displacement distance to determine when the phase 3 of the process is safely reached and to control the joining velocity in this phase.

19 Claims, 2 Drawing Sheets

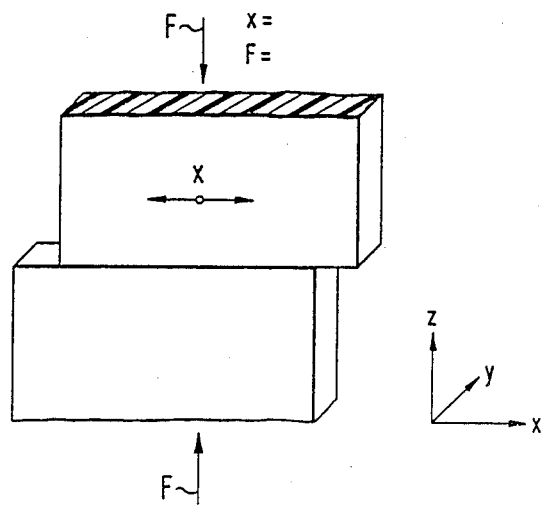
Fig. 1
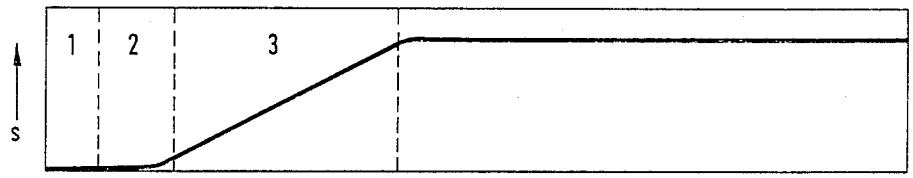
Fig. 2
Fig. 3
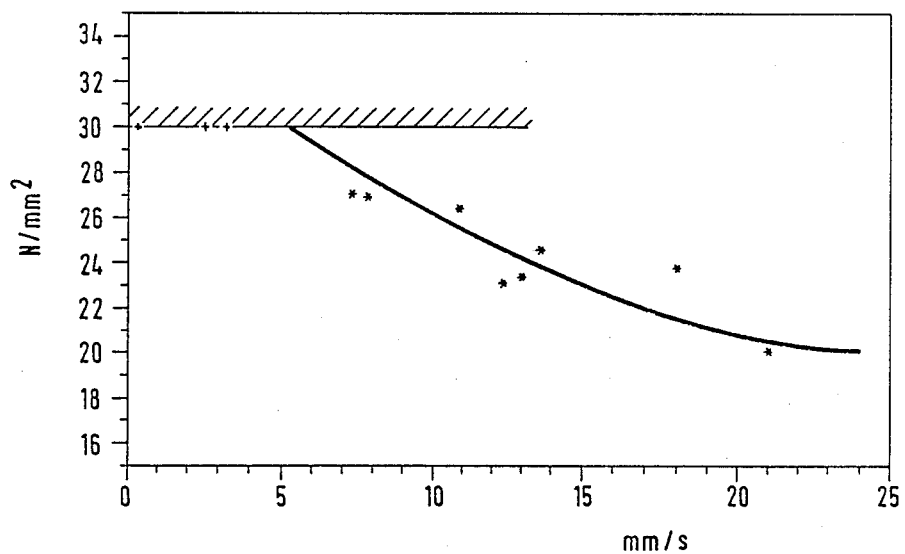

METHOD FOR CONTROLLING MACHINE PARAMETERS IN FRICTION WELDING

BACKGROUND OF THE INVENTION

The present invention relates to a method for controlling certain machine parameters in friction welding as well as an apparatus for performing the method.

In friction welding the workpieces are rubbed against each other in an oscillating translational motion until the material melts in the contact zone and flows together in the contact area. Then the vibration is terminated, the process resulting in an integral connection during cooling down. Characteristic parameters for this method are the joining force F resulting in a joining pressure and the relative motion x of the workpieces in the rubbing direction. This is shown in FIG. 1. Both parameters are time-responsive. As a rule, the joining pressure is maintained constant. The relative motion of the workpieces, however, is substantially defined by a sinus oscillation having a predetermined amplitude and frequency.

The vibration welding procedure is performed in a plurality of steps which follow each other. In a first step the members to be joined are transported to receiving means of the machine and fixedly secured thereto. Then both members are displaced towards each other until they come into contact. After a short delay time under a static contact force the vibration is initiated. The material first softens by friction and then more and more due to a hysteretic sheering heating. During this process the molten material is urged to flow into the welding bead by the joining pressure exerted. Consequently the workpieces are displaced towards each other in z direction; the joining displacement s increases. After some seconds the vibration is terminated. The piece still remains under the joining pressure or, respectively, holding pressure, for a short time to allow for proper cooling down. Subsequently the receiving means are opened and the piece may be removed.

In order to obtain high strength connections the material must undergo a sufficient melting process and joining pressure. Hitherto these requirements have been observed by maintaining at least a minimum joining distance. Further, the formation of a uniform and well-shaped welding bead is visually inspected. However, this is successful with simple geometric designs of the workpieces only and with workpieces which possess very little tolerances. More complicate workpieces, however, often have internal welding zones. Furthermore, workpieces made by an injection molding process exhibit substantial tolerances in dimensions. Therefore an optical inspection of the bead along the outer face of the piece in combination with a minimum joining displacement distance is not sufficient anymore to rely on.

SUMMARY OF THE INVENTION

Therefore it is an object of the present invention to improve the method of friction welding in particular under the aspect that the characteristic values for friction welding are selected such that the quality and strength of the welding connections are improved. It is a further object of the invention to disclose an apparatus for performing the method.

The present invention provides a method for controlling certain machine parameters in friction welding, comprising the steps of subjecting the members to be joined to an oscillating relative motion until the material melts in the contact zone, displacing said members towards each other by applying a joining force and terminating the vibration to obtain an integral welding connection during cooling, the improvement characterized by measuring at least a time-dependent parameter which is characteristic for the process during vibration and terminating the vibration after a period of time in which the melting flow of the material in the melting zone is continuous and in which the displacement approximately increases linear with time.

It has been found that the time dependency of the parameters above referred to, such as displacement distance and amplitude of oscillation results in three distinct phases during the process of vibration (FIG. 2).

The displacement distance s has a first phase in which s exhibits a very little increase. In a subsequent second phase the displacement shows a progressive increase. In a third phase the displacement increases proportional to time, assuming of course that the joining pressure is maintained constant.

According to the invention testing has shown as a condition of good welding connections that at least the following requirement must be fulfilled: the very phase 3 must be obtained during the vibration process.

As long as one relies on the visual inspection of the welding bead the drawback is inherent that different welding zones of the members to be joined are in different phases of the process during vibrating. For example, some external zones of the workpiece have reached phase 3 when the vibration is terminated, but it is possible that some internal zones of the pieces are not even in contact with each other. Consequently, there may be zones only having reached phase 1 or 2 when the oscillation is turned off.

According to the invention, at least one of the characteristical parameters, in particular the displacement distance is measured during the vibration period to allow for an accurate distinction between the different phases of processing. In particular, the differentiation in time of the displacement, i.e. the displacing velocity is a preferred indicator for reaching phase 3. In this phase 3, the displacement increases linear with time in a first approximation. The differentiation is thus a constant value. This constant value will be obtained only when phase 3 is reached in all contact zones of the workpieces.

Tests have further shown that a further requirement should be fulfilled for obtaining improved welding connections: during phase 3 the melting velocity in the melting zone should not exceed a critical value. There is a clear relation between the mechanical characteristics of a friction welding connection and the mean flow velocity of the molten material; The flow velocity is specific for the material and is correlated with the joining velocity. Accordingly it is possible to determine the displacing velocity in response to the displacement distance to obtain a criterion of quality for the friction welding connection. For this the displacing velocity is used as a control value for the process in order to control the displacing velocity by means of the joining pressure or the joining force of a drive means moving the workpieces towards each other in a way to not succeed a predetermined desired value for the melting velocity.

The mean or average flow velocity within the welding zone may be calculated from the displacing velocity in phase 3, the thickness of the weld seam, the density of the solid material, the density of the molten material and the thickness of the workpieces. Testing shows a clear interrelation between the mean flow velocity and the strength such as resistance to tearing or, respectively, yield strength of the connection. High melting velocities result in low strength. Strength continuously increases with falling melting velocity. At a certain mean melting velocity the strength characteristics for the solid material are obtained. FIG. 3 shows an example for the interrelation between strength and mean flow velocity. Accordingly the flow velocity of the molten material should be restricted in friction welding of polypropylene. Testing shows that good mechanical characteristics are obtained with a mean flow velocity of the melt of substantially smaller than 5 mm/s.

Additional advantages and benefits of the present invention will become apparent upon a reading of the description taken in conjunction with the accompanying drawing.

BRIEF DESCRIPTION OF THE DRAWING

FIG. 1 is a basic illustration of the linear vibration welding;

FIG. 2 shows the joining displacement as a function of time;

FIG. 3 illustrates the relation between welding strength and a mean flow velocity;

DETAILED DESCRIPTION

FIG. 1 to 3 are extensively discussed in the preceeding description.

Figure 4:
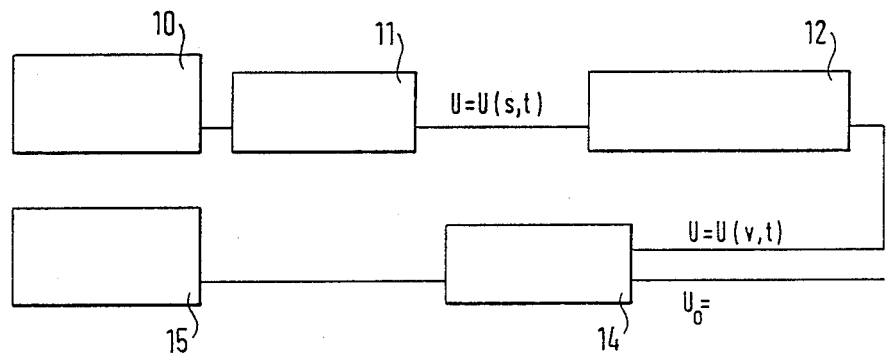
FIG. 4 is a schematic illustration of a preferred embodiment of a turning-off circuit controlled in response to displacement and FIG. 5 shows a schematic diagram of an embodiment to control the joining velocity.

FIG. 4 shows a displacement transducer 10 which is secured to a movable clamping device not shown, in which clamping device one of the workpieces to be welded together is . received. This clamping device is moved towards a stationary clamping device by means of a hydraulical cylinder. This results in the displacing distance s in the z direction of FIG. 1. The cylinder not shown exerts a predetermined pressure, i.e. the machine operates under a force control. The thickness signal provided by the displacement transducer 10 is amplified in an amplifier 11 and is then supplied to a differentiating circuit 12. The output signal of the differentiating circuit 12 thus represents the joining velocity as a differentiation of the distance s after time. A comparing circuit 14 is connected to the circuit 12 and the thickness signals provided by the circuit 12 are compared to each other in short distances, for example in distances of 0.1 s. When a plurality of identical values follows each other, which means that the joining velocity is constant, the comparing circuit 14 delivers an output signal "vibration off" which turns off the vibrating motion of the machine via a switch 15. As already explained this means that phase 3 of the melting process shown in FIG. 2 has been safely reached in all contact zones of the pieces to be joined.

Figure 5:
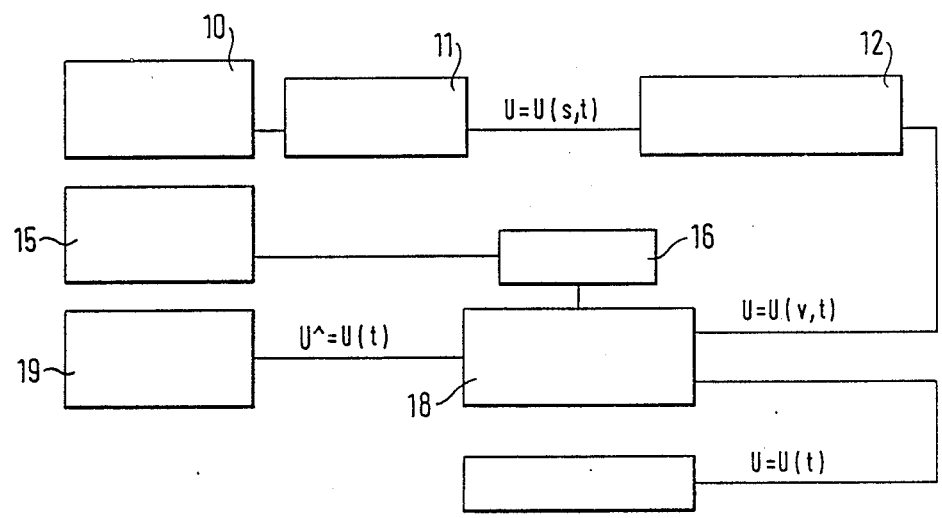

FIG. 5 again shows a displacement transducer, an amplifier 11 and a differentiating circuit 12. Again the output signal of the circuit 12 is used to indicate when the process reaches phase 3 by determining identical values for the joining velocity. The embodiment of FIG. 5 does not provide for immediately turning off the vibration rather the output signal of the differentiating circuit is applied to a time delay circuit 16 for turning off the vibration after a delay of time.

During this time the output signal of the differentiating circuit 12 is fed to a control 18 for comparing this output signal with a desired value for a mean flow velocity. The output of the controller 18 is fed to a proportional solenoid 19 to control the flow of a pressurized fluid between the hydraulical cylinder actuating the movable clamping device of the machine and a pressure source or a reservoir. The proportional solenoid 19 is controlled by the controller 18 such that the force exerted by the cylinder and thus the joining velocity reaches, but not exceeds the set desired value. After a predetermined time delay, the machine is turned off by the time circuit 16.

There may be an advantage to vary the joining force during the welding procedure, in particular to control the force in steps. For example, the joining force is relatively high initially during the first phase of welding and is then decreased in phase 3. Thereby the welding procedure may be accelerated. It may be further of advantage to control the amplitude of the vibration to vary the joining velocity. Alike, the amplitude may be increased during the first phase and may be then decreased in phase 3. It is first noted that the height of the holding pressure of the workpieces during solidification of the molten material affects the welding quality. The holding pressure thus should be selected so that the best possible strength is obtained. Preferably the holding pressure should not be changed with respect to the joining pressure reached in phase 3.

We claim:

1. In a friction welding process having the steps of contacting a plurality of members to be connected in a contact zone, subjecting at least one of the members to an oscillatory vibration motion relative to at least one other of the members which causes portions of the members in the contact zone to melt, displacing said members toward each other by applying a joining force and terminating the vibration to obtain an integral connection of the members in the contact zone during a cooling down period, the improvement comprising the steps of periodically determining joining velocities of the members while the members are being displaced toward each other and terminating the vibration after the members attain a constant joining velocity.

2. The method of claim 1, characterized by measuring a displacement distance and calculating the joining velocity by differentiating said distance.

3. The method of claim 2, characterized by comparing the joining velocity obtained by measuring the joining displacement with a constant value to determine the constant joining velocity.

4. The method of claim 1, characterized by delaying termination of the vibration for a time delay after reaching a constant joining velocity.

5. The method of claim 4, characterized by controlling a displacement distance during the time delay such that a predetermined flow velocity of the molten material is not exceeded.

6. The method of claim 5, characterized by controlling said displacement distance by means of the force urging the joining members towards each other.

7. The method of claim 6, characterized by controlling the joining force during the welding process in stages.

8. The method of claim 1, characterized, by controlling the amplitude of the oscillation during the welding process.

9. The method of claim 1, characterized by maintaining a holding pressure on the members during solidification of the molten portions of the members, wherein the holding pressure is about equal to the joining force on the members at the time when the vibration is terminated.

10. An apparatus for friction welding a plurality of members comprising a measuring means for measuring displacement distances of the members while subjecting at least one of the members to an oscillator vibrating motion relative to at least one of the other members, a determining means for receiving the displacement distances from the measuring means and determining instantaneous joining velocities of the members, a comparing means for receiving the instantaneous joining velocities from the determining means, comparing the instantaneous joining velocities, and transmitting a termination signal when the instantaneous joining velocities attain a constant value, and a switching means for terminating the vibrating motion when the termination signal is received from the comparing means.

11. The apparatus of claim 10 wherein said measuring means is a displacement transducer.

12. The apparatus of claim 10 wherein said determining means is a differentiating circuit.

13. The apparatus of claim 10 wherein said comparing means is a comparing circuit.

14. An apparatus for friction welding a plurality of members comprising a measuring means for measuring displacement distances of the members while subjecting at least one of the members to an oscillatory vibrating motion relative to at least one of the other members, a determining means for receiving the displacement distances from the measuring means and determining instantaneous joining velocities of the members, a comparing means for receiving the instantaneous joining velocities from the determining means, comparing the instantaneous joining velocities, and generating an output signal when the instantaneous joining velocities attain a constant value, a delaying means for terminating the vibrating motion after a predetermined time delay in response to the output signal of the comparing means, a control means for receiving the instantaneous joining velocities from the determining means, comparing the instantaneous joining velocities to a desired joining velocity value and generating a control signal in response thereto, and a drive means for driving the members at a controlled joining velocity in response to the control signal from the control means during the predetermined time delay.

15. The apparatus of claim 14 wherein said measuring means is a displacement transducer.

16. The apparatus of claim 14 wherein said determining means is a differentiating circuit.

17. The apparatus of claim 14 wherein said comparing means is a comparing circuit.

18. The apparatus of claim 14 wherein said delaying means is a time delay circuit and switch.

19. The apparatus of claim 14 wherein said drive means is a solenoid.

* * * * *